United States Patent

Sanera

[15] 3,640,197

[45] Feb. 8, 1972

[54] PRODUCTION OF FINE SINGLE LINES AND OF DISCRETE CLOSELY SPACED FINE LINES

[72] Inventor: Arthur E. Sanera, Mesa, Ariz.

[73] Assignee: Motorola, Inc., Franklin Park, Ill.

[22] Filed: Jan. 22, 1970

[21] Appl. No.: 4,842

[52] U.S. Cl. ....................................95/12, 350/162, 355/102
[51] Int. Cl. ........................................................G03b 29/00
[58] Field of Search ................95/12; 355/102, 109, 103, 43, 355/66; 346/108; 350/162

[56] References Cited

UNITED STATES PATENTS

| | | | |
|---|---|---|---|
| 3,506,327 | 4/1970 | Leith et al. | 350/162 |
| 3,266,393 | 8/1966 | Chitayat | 95/1.1 |
| 3,492,072 | 1/1970 | Haun, Jr. | 355/78 |
| 3,457,012 | 7/1969 | Ucko et al. | 355/103 |
| 3,247,761 | 4/1966 | Herreman et al. | 95/12 |
| 3,306,176 | 2/1967 | Myers | 355/103 |

*Primary Examiner*—Samuel S. Matthews
*Assistant Examiner*—Robert P. Greiner
*Attorney*—Mueller and Aichele

[57] ABSTRACT

An apparatus is provided to produce fine single lines and discrete closely spaced fine lines by use of an opaque mask having relatively wide transparent slits or lines therein. The apparatus includes, besides the mask, a source of monochromatic light and a spacer, which may be transparent, of the correct thickness.

7 Claims, 2 Drawing Figures

PATENTED FEB 8 1972

3,640,197

INVENTOR.

Arthur E. Sanera

BY

Mueller, Aichele & Rauner

ATTY'S.

PRODUCTION OF FINE SINGLE LINES AND OF DISCRETE CLOSELY SPACED FINE LINES

BACKGROUND

In the production of small semiconductor devices, for example, as the semiconductor devices become smaller it becomes necessary to produce finer and finer lines which are closer and closer together and which are easily reproducible in an economical manner. Production of such lines by processes including mechanical ruling becomes very difficult as the lines become finer and the distance therebetween becomes less, and, in fact, very fine single lines or very fine lines which are very close together cannot be made by mechanical processes.

It is an object of this invention to provide apparatus for producing extremely fine lines either singly, or in pairs, which are extremely close together.

SUMMARY

In accordance with this invention, means are provided for producing substantially parallel arrays of monochromatic light. A mask having at least one fine slit therein and a spacer which may be transparent and having the correct or proper thickness are provided. Then, when the spacer is put on an area of photosensitive material on which the lines are to be produced, the mask is put on the spacer and the material is exposed to the monochromatic light, a single very fine line or two very fine distinct lines are produced on the material, after development thereof by a photo development process, for each slit in the mask, the lines and their spacing (if any) when added together being narrower than the slit in the mask.

DESCRIPTION

Figure 1:
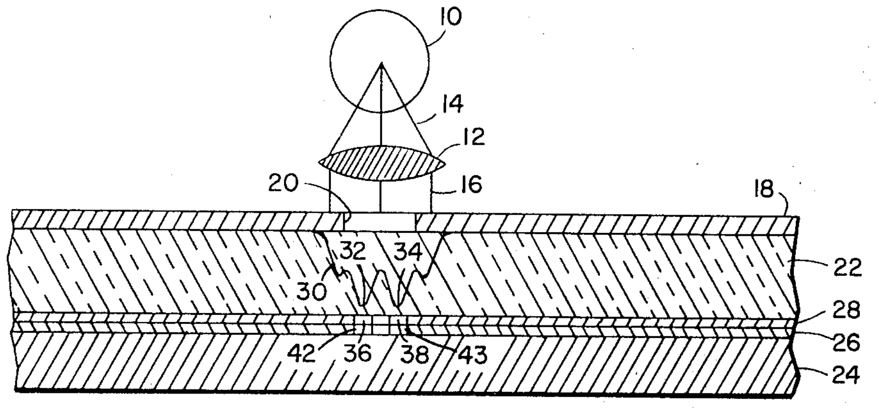
Figure 2:
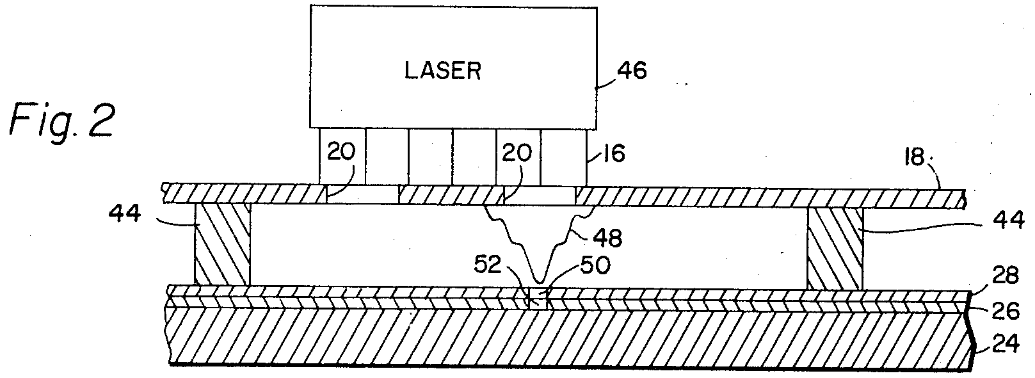

The invention will be better understood upon reading the following description in connection with the accompanying drawing in which FIG. 1 illustrates an apparatus provided in accordance with this invention, and FIG. 2 illustrates another embodiment of the apparatus of FIG. 1.

In FIG. 1, a source 10 of monochromatic light is provided. The light from the source 10 strikes a lens or lens system 12 which changes the direction of the radial rays 14 to parallel rays 16. A mask 18 is positioned perpendicularly to the direction of the rays 16, there being a slit 20 in the mask in the path of the parallel rays 16. The mask 18 has a minimum thickness. A spacer 22 is positioned with one side thereof in contact with the side of the mask 18. A substrate 24, which may be of N-type silicon, has a layer of silicon dioxide 26, for example, on one side thereof. A layer 28 of photoresist material is applied to the free side of the silicon dioxide layer 26 and the spacer 22 is laid on the photoresist layer 28. The spacer 22 is transparent to the light emitted from the source 10 and has a thickness which is related to wavelength of the light emitted by the source 10 and to the width of the slit 20. When the wavelength of the light 10 and the thickness of the spacer 22 and the width of the slit 20 are properly chosen, by interference phenomenon, the light hitting the photosensitive surface 28 will have an intensity such as that indicated by the curve 30, the zero for the intensity curve 30 being the bottom (as viewed in the Figure) of the mask 18. It will be noted that the curve 30 has two peaks 32 and 34 and that the light intensity falls off rapidly at each side of and between the peaks 32 and 34 and that the peaks 32 and 34 are quite narrow with respect to the width of the slit 20. Upon proper exposure, lines 36 and 38 will be produced in the photoresist 28, and upon washing away the exposed portion of the photoresist 28, very fine slots 42 and 43 can be etched in the silicon dioxide layer 26 in a known manner through which P-type of dopant material can be diffused into the N-type substrate 24, in the process of making solid-state semiconductor devices.

FIG. 2 differs from FIG. 1 in that a laser 46 is used to produce monochromatic parallel rays 16 of light instead of the source 10 and lens system 12 of FIG. 1, and in that a spacer comprising separated parts 44 is used instead of the transparent spacer 22 of FIG. 1. Also, the spacing provided by the spacer 44, the wavelength of light produced by the laser 46 and the width of the slit 20 are so chosen as to produce light having an intensity in accordance with the curve 48.

It is noted that the curve 48 has a single peak which is below the center of the slit 20 and which is much narrower than the slit 20. Again, upon proper exposure, line 50 will be produced on the photoresist 28 and upon washing away the exposed portion of the photoresist 28, a very fine line 52 can be etched in the silicon dioxide layer 52 for doping the substrate 24 in a known manner.

While a light source and lens system are used in FIG. 1 and a laser is used in FIG. 2, either may be used in either Figure. Similarly, the transparent spacer 22 of FIG. 1 and the spacer 44 of FIG. 2 may be substituted for each other.

When multiple slits 20, 20 (see FIG. 2) are used, the distance between the edges of the slits 20, 20 should be about one and quarter times the width of the slits.

The expression connecting the wavelength of the light used, the width of the slit 20 and the spacing provided by the spacer 22 or 44 to produce the desired interference pattern that results in the light intensity curves 30 and 48 is very complicated and is found in textbooks on the subject. The variables may be determined by solving the expression by using known computers. A few examples are given hereinbelow. It should be noted that the wavelength of light used must be such that the photoresist material is sensitive thereto.

It has been found that with the wavelength of light of about 0.356 microns produced by a suitable source, with the slit 20 width of about 2.5 microns and with the thickness of the spacing layer 22 or 44 of about half a micron, two lines 36 and 38 can be produced on the photoresist 28 that are each about half a micron wide and are spaced about half a micron from each other. Using the same source of light and the same width of slit and a spacer having a thickness of one micron, results in finer lines a little further apart. Using the same source and the same width of the slit 20 and a spacer 22 or 44 of a thickness of 2.5 microns, the curve 30 of light intensity illustrated in the FIG. 1 is realized whereby the slits 36 and 38 may be produced. Using the same source and the same width of slit 20 and a spacer 22 or 44 thickness of 5 microns, the pattern 48 of FIG. 2 results whereby a very sharp narrow single line which is about half a micron wide and centered with respect to he slit 20 is produced. At a spacer thickness of 10 microns, the peak intensity of light produced is wider and at 25 microns thickness of the spacer 22 or 44, no line will be produced on the photoresist 28. With other sources of monochromatic light, other thicknesses of spacer will be used with the slits that are chosen to produce discrete lines that are very close together or single lines if desired. While many photoresist materials may be used, a photoresist material which has been found suitable is called "Shipleys." The spacer 22 and mask 18 may be combined and may be chrome deposited on glass with the slits cut in the chrome material.

What is claimed is:

1. Apparatus utilizing light interference for producing at least one narrow line on a surface of an article comprising:
   - means for directing parallel rays of monochromatic light on a mask,
   - said mask having at least one optical slit therein, said slit being wider than said narrow line on said surface,
   - a spacer, to provide a spacing between said mask and said surface, which has a thickness greater than the width of said narrow line on said surface, one side of said spacer being in contact with said mask and the other side of said spacer being in contact with said surface, and with said optical slit and said spacer acting to produce said narrow line on said surface by light interference.

2. The invention of claim 1 in which said surface has a layer of photosensitive material thereon.

3. The invention to claim 1 in which said slit is about 2 microns wide and in which said spacer is from about one-half to about 2 microns thick, said light having a wavelength of about a third of a micron, whereby two parallel closely spaced lines are produced.

4. The invention of claim 1 in which said slit is about 2½ microns wide, said spacer is about 2½ microns thick, and said light has a wavelength of about 0.356 microns, whereby two parallel closely spaced lines are produced.

5. The invention of claim 1 in which said slit is about 2½ microns wide, said spacer is about 5 microns thick, and said light has a wavelength of about 0.356 microns, whereby a single fine line is produced.

6. The invention of claim 1 in which said spacer is transparent with opaque material being deposited on said transparent spacer and said slit being provided in said opaque material.

7. The invention of claim 1 in which said spacer comprises separated parts.

* * * * *